US010785040B2

(12) United States Patent
Bill et al.

(10) Patent No.: US 10,785,040 B2
(45) Date of Patent: Sep. 22, 2020

(54) SECURE COMMUNICATIONS (71) Applicants: Airbus Operations Limited, Bristol (GB); Airbus Operations GmbH, Hamburg (DE)

(72) Inventors: Andrew Bill, Bristol (GB); Kurt Bruggemann, Bristol (GB); Timo Warns, Hamburg (DE)

(73) Assignees: AIRBUS OPERATIONS LIMITED, Bristol (GB); AIRBUS OPERATIONS GMBH, Hamburg (DE)

( * ) Notice: Subject to any disclaimer, the term of this patent is extended or adjusted under 35 U.S.C. 154(b) by 120 days.

(21) Appl. No.: 15/606,172

(22) Filed: May 26, 2017

(65) Prior Publication Data

US 2017/0346643 A1 Nov. 30, 2017

(30) Foreign Application Priority Data

May 27, 2016 (GB) .................................. 1609420.3

(51) Int. Cl.
*G06F 15/173* (2006.01)
*H04L 9/32* (2006.01)
(Continued)

(52) U.S. Cl.
CPC .......... *H04L 9/3271* (2013.01); *B64C 25/001* (2013.01); *B64D 45/00* (2013.01);
(Continued)

(58) Field of Classification Search
CPC ..... H04L 9/3271; H04L 9/321; H04L 63/045; H04L 63/0492; H04L 63/062;
(Continued)

(56) References Cited

U.S. PATENT DOCUMENTS 7,231,180 B2 6/2007 Benson et al.
8,107,397 B1 1/2012 Bagchi et al.
(Continued)

FOREIGN PATENT DOCUMENTS

CN 103442359 12/2013
EP 1 803 249 7/2007
(Continued)

OTHER PUBLICATIONS

Jamal N. Al-Karaki et al., "On the Development of Adaptive and Self-Dependent Secure Routing Protocol (ASSP) for Wireless Sensor Networks", Jordan University of Science and Technology, Nov. 2010, 9 pages.
(Continued)

*Primary Examiner* — Ryan J Jakovac
(74) *Attorney, Agent, or Firm* — Nixon & Vanderhye P.C.

(57) ABSTRACT

A system including a sensor, a computing device and a Wireless Access Point (WAP). The sensor in response to receipt of an initiation signal, via a first communication channel, from a relatively proximal computing device, is arranged to generate and store first security information and to transmit, wirelessly via a second communications channel, a first message comprising information representing at least a part of the first security information. The WAP, which is remote from the sensor is arranged to receive and store the first message. The WAP is arranged to generate second security information and to transmit wirelessly to the computing device, via a third communications channel when the computing device is within range of the WAP, a second message comprising information representing at least a part of the second security information. The sensor is arranged to receive at least the second message via only the first communications channel.

22 Claims, 6 Drawing Sheets

(51) Int. Cl.

| | | |
|---|---|---|
| *B64D 45/00* | (2006.01) | |
| *H04L 29/06* | (2006.01) | |
| *H04W 88/04* | (2009.01) | |
| *H04W 12/08* | (2009.01) | |
| *B64C 25/00* | (2006.01) | |
| *G07C 5/00* | (2006.01) | |
| *H04L 9/08* | (2006.01) | |
| *G06F 21/44* | (2013.01) | |
| *H04W 12/04* | (2009.01) | |
| *H04W 48/08* | (2009.01) | |
| *B64C 25/34* | (2006.01) | |
| *B64C 25/42* | (2006.01) | |
| *B64C 25/50* | (2006.01) | |
| *H04W 88/08* | (2009.01) | |

(52) U.S. Cl.
CPC ............ *G07C 5/008* (2013.01); *H04L 9/0819* (2013.01); *H04L 9/321* (2013.01); *H04L 63/045* (2013.01); *H04L 63/0492* (2013.01); *H04L 63/062* (2013.01); *H04W 12/08* (2013.01); *H04W 88/04* (2013.01); *B64C 25/34* (2013.01); *B64C 25/42* (2013.01); *B64C 25/50* (2013.01); *B64D 2045/0085* (2013.01); *G06F 21/44* (2013.01); *H04L 9/0838* (2013.01); *H04L 63/08* (2013.01); *H04L 63/166* (2013.01); *H04L 2209/80* (2013.01); *H04W 12/04* (2013.01); *H04W 48/08* (2013.01); *H04W 88/08* (2013.01)

(58) Field of Classification Search
CPC ... H04L 9/0838; H04L 63/08; H04L 2209/80; H04W 88/04
See application file for complete search history.

(56) References Cited

U.S. PATENT DOCUMENTS

| | | | |
|---|---|---|---|
| 8,332,133 B2 | 12/2012 | Ferro et al. | |
| 8,346,949 B2* | 1/2013 | Vaarala | H04L 63/123 |
| | | | 709/229 |
| 8,787,904 B1 | 7/2014 | Hayes et al. | |
| 9,008,868 B1 | 4/2015 | Bantoft et al. | |
| 9,043,938 B1 | 5/2015 | Raghu et al. | |
| 9,509,679 B2 | 11/2016 | Abbott | |
| 2004/0073571 A1 | 4/2004 | Kumhyr et al. | |
| 2005/0262575 A1* | 11/2005 | Dweck | H04L 63/0428 |
| | | | 726/28 |
| 2006/0252422 A1* | 11/2006 | Kauffman | B64D 45/0015 |
| | | | 455/431 |
| 2009/0063852 A1* | 3/2009 | Messerges | H04L 9/321 |
| | | | 713/156 |
| 2009/0167535 A1 | 7/2009 | Sanchez et al. | |
| 2009/0243895 A1 | 10/2009 | Mitchell et al. | |
| 2010/0164693 A1* | 7/2010 | Zhang | H04L 12/2809 |
| | | | 340/10.31 |
| 2010/0290622 A1 | 11/2010 | Garcia Morchon et al. | |
| 2011/0299470 A1 | 12/2011 | Mueller et al. | |
| 2013/0268759 A1 | 10/2013 | Blankenbeckler et al. | |
| 2014/0028818 A1 | 1/2014 | Brockway, III et al. | |
| 2014/0376721 A1 | 12/2014 | Perez et al. | |
| 2015/0030158 A1 | 1/2015 | Noda | |
| 2015/0071139 A1 | 3/2015 | Nix | |
| 2015/0203216 A1 | 7/2015 | Goldstein et al. | |
| 2015/0363981 A1 | 12/2015 | Ziarno et al. | |
| 2016/0099922 A1* | 4/2016 | Dover | H04L 63/061 |
| | | | 713/171 |
| 2016/0285844 A1 | 9/2016 | Olivereau et al. | |
| 2016/0294829 A1 | 10/2016 | Angus | |
| 2016/0334786 A1 | 11/2016 | Warpinski et al. | |
| 2017/0201937 A1 | 7/2017 | Zhang et al. | |
| 2019/0007408 A1 | 1/2019 | Angus | |

FOREIGN PATENT DOCUMENTS

| | | |
|---|---|---|
| EP | 1876759 | 1/2008 |
| EP | 1993301 | 11/2008 |
| EP | 2 031 538 | 3/2009 |
| EP | 2706423 | 3/2014 |
| WO | 2007041824 | 4/2007 |
| WO | 2008122906 | 10/2008 |
| WO | 2013121076 | 8/2013 |

OTHER PUBLICATIONS

K.Sampigethaya et ai: 'Secure wireless coiiection and distribution of commercial airplane health data', 26th Digital Avionics Systems Conference, Dallas, TX, (Oct. 21, 2007), 8 pages.

Thanah Dal Tran: 'Controllled Link Establishment Attacks on Distributed Sensor Networks and Countermeasures', Dec. 2010, University of Technology, Sydney, 193 pages.

T. Kavitha et al: 'Security Vulnerabillities in Wireless Sensor Networks: A Survey', Journal of Information Assurance and Security 5 (2010), Dynamic Publishers, Inc., pp. 031-044.

* cited by examiner

SECURE COMMUNICATIONS

RELATED APPLICATION

This application claims priority to United Kingdom Patent Application GB 1609420.3 filed 27 May 2016, the entire contents of each of which are hereby incorporated by reference.

TECHNICAL FIELD

The present invention relates to remote sensor systems and particularly, although not exclusively, to establishment of secure communications with and/or for remote sensor systems.

BACKGROUND

Exchanging information securely or confidentially between devices, which are in communication with one another over a wireless network, presents a security challenge. In particular, an ability in the first instance to establish a secure communications channel between wireless devices, after which secure communications can commence, presents a particular security challenge. Conventional techniques may rely on, for example, cryptography to protect communicated information and render it unreadable by unauthorized parties. However, in some circumstances, restrictions on the capabilities of some devices, such as remote sensors and the like, may present further challenges in terms of their having a limited capability to pre-store cryptographic information, such as keys, and/or perform computations that are necessary for encryption and the like.

SUMMARY

A first aspect of the present invention provides a system comprising a sensor which is responsive to receipt of an initiation signal, via a first communications channel, from a relatively proximal computing device, to generate and store first security information and to transmit, wirelessly via a second communications channel, a first message comprising information representing at least a part of the first security information; and a Wireless Access Point (WAP), which is remote from the sensor and which is arranged to receive and store the first message, to generate second security information and to transmit wirelessly to the computing device, via a third communications channel when the computing device is within range of the WAP, a second message comprising information representing at least a part of the second security information, wherein the sensor is arranged to receive at least the second message via only the first communications channel.

Optionally, the first communications channel is a wireless communications channel.

Optionally, the first communications channel is a short-range communications channel.

Optionally, the second communications channel is a medium range communications channel.

Optionally, the WAP is arranged to communicate wirelessly with the computing device and sensor on a medium range wireless interface.

Optionally, the sensor and WAP are surrounded by a secure perimeter.

Optionally, at least part of the WAP is physically shielded.

Optionally, the WAP and the sensor are arranged to establish, based on the first on the first and second security information, a secure communications channel and to communicate securely thereon with one another.

Optionally, the first security information and the second security information each comprise a public and private parameter and wherein the sensor and WAP are arranged to store their respective private parameters and transmit their respective public parameters in the first and second messages.

Optionally, the public and private parameters relate to a Diffie-Hellman parameter pair and wherein the sensor and WAP each compute a cryptographic key by the Diffie-Hellman protocol from the received messages.

Optionally, the sensor is arranged to send the WAP a message authentication code computed from the cryptographic key generated by the Diffie-Hellman protocol.

Optionally, the sensor is communicatively coupled to a processor and a storage device and wherein, in response to the initiation signal, the sensor is arranged to: instruct the processor to generate first security information and store at least part of the first security information at the storage device.

Optionally, the systems comprises a plurality of sensors and at least one WAP.

Optionally, a first sensor of the plurality of sensors is arranged to establish a secure communications channel with a second sensor of the plurality of sensors, in secure communication with the WAP and communicate securely thereon with the second sensor.

Optionally, the sensor is arranged to transmit via the second communications channel a third message to the WAP, wherein the third message comprises an acknowledgement that the second message was received at the sensor.

Optionally, the first message comprises location information of the sensor relative to the WAP.

Optionally, in response to receipt of a third message from the sensor at the WAP, the WAP is arranged to determine from location information received in the first message, if the sensor is a replacement sensor for a previous sensor identified at the same location relative to the WAP, and in response to determining the sensor is a replacement sensor, removing security information relating to the previous sensor.

Optionally, the plurality of sensors are identified by a position relative to at least one WAP.

A second aspect of the invention provides a method of exchanging security information between a sensor and a WAP comprising: receiving an initiation signal over a first communications channel at the sensor from a relatively proximal computing device; generating and storing first security information at the sensor in response to receipt of the initiation signal; transmitting wirelessly via a second communications channel to the WAP, a first message comprising information representing at least part of the first security information; receiving and storing the first message at the WAP; generating and storing second security information at the WAP; transmitting wirelessly, via a third communications channel, to the computing device when the computing device is within range of the WAP, a second message comprising information representing at least part of the second security information; and receiving and storing the second message via only the first communications channel at the sensor.

BRIEF DESCRIPTION OF THE DRAWINGS

Embodiments of the invention will now be described, by way of example only, with reference to the accompanying drawings, in which.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Providing secure communications channels between two or more parties which are physically separated from one another is a problem in modern networked environments. Central to solving this problem is the use of cryptographic techniques such as encryption and authentication to provide certain security guarantees to the parties wishing to communicate. For example, end-to-end encryption provides a means of securing data such that only parties directly communicating with one another can read the messages being passed, while no eavesdropper (without access to the parties' cryptographic keys) can access their conversations. Authentication provides to a recipient guarantees of a particular attribute of a message. For example, digitally signing a message provides the recipient with a guarantee that the message originated from a particular sender. Such methods have been widely deployed since the advent of public key cryptography in the 20$^{th}$ Century.

One kind of security threat that concerns practitioners is a so-called man-in-the-middle attack. Such attacks occur when an unauthorized party intercepts and/or obtains messages being passed on a secure channel between a party and an intended recipient. The unauthorized party may alter those messages with the goal of compromising the underlying security of the communications channel between the parties. For example, two parties may set up a secure communications channel using end-to-end encryption. However, unless appropriate authentication is deployed, neither party can be sure of the origin of the messages they are receiving. This leaves them exposed to man-in-the-middle attacks by unauthorized parties. For example, if an unauthorized party is able to replace a message which contained the cryptographic key required to encrypt and decrypt messages being passed between the legitimate parties, the unauthorized party would have the ability to replace the legitimate key with his own key during a key agreement protocol. This would allow the attacker to decrypt all future communications between the parties and also inject his own data into their communications channel.

A number of techniques can be used to prevent man-in-the-middle attacks. For example, one technique is to use an authenticated key exchange protocol. In such a protocol, the parties possess trusted cryptographic keys which may be exchanged and used to verify signatures or authentication codes on messages that are sent at a later stage between the parties. In this case, each party must trust that the respective cryptographic keys have originated from a trusted source or, alternatively, that the cryptographic key has been verified as authentic by a trusted source. Alternatively, a trusted third party may vouch for the authenticity of messages, or facilitate an exchange of public keys whereby each party trusts the other party's key by virtue of the involvement of the third party, as long as the communications channels with the third party are trusted channels.

In certain real world scenarios it may be the case that an environment in which a computing device is operating imposes restrictions on the availability of certain cryptographic techniques. As an example, a computing device may be constructed in an environment in which it is not possible to guarantee the security of cryptographic key material on the computing device, and hence it is not possible to include a factory pre-set key which can be trusted by other parties at a later time. A computing device may move from an untrusted environment to a trusted environment only after which it becomes safe to store cryptographic key material and execute cryptographic algorithms on the computing device to, for example, communicate securely with another party. It is important to maintain security for other parties during the operational life-cycle of the computing device when in a trusted environment and when the computing device is removed from the trusted environment at a later stage. For example when the device is removed from the trusted environment, any cryptographic keys stored on the computing device may not be trusted and may become redundant.

Certain examples described herein relate to methods and systems of establishing a secure wireless communications channel between a sensor and a WAP, are separated from and inaccessible to one another. The sensor in this context may, for example, have a sensing capability and a communications capability for communicating sensing information to the WAP. An initial exchange of security information may be required for establishing a secure wireless connection between the sensor and the WAP. According to an example, the sensor and WAP may be fixedly located in relative proximity to one another, and a secure communications channel may be established by a trusted third party device, which is located within a so-called 'secure perimeter'. In this context, the secure perimeter may be determined (for example by controlling beam shapes, limiting signal ranges and/or directions) to be a pre-determined distance from, and/or location with respect to at least the sensor and the WAP, or it may be defined as being a zone or zones, which unauthorized persons cannot physically enter. The secure perimeter is such that signals to and from the WAP cannot be received and/or, respectively, sent outside of the secure perimeter. According to an example, this is achieved by surrounding the WAP, at least in part, by physical shielding. This ensures that signals received at the WAP can be trusted as they can only have been sent by devices located within the secure perimeter and that signals sent from the WAP are only received by authorised persons within the secure perimeter.

In an example, initially, the sensor may be moved into the secure perimeter from outside of the secure perimeter, for example, to be fixed for the first time at its intended location. The sensor is initially untrusted and is typically not pre-loaded with information for establishing a secure communications channel with the WAP. The present approach to establishing a secure connection, to prevent unauthorized parties from performing a man in the middle attack, involves a third party (or 'trusted') computing device, which is operable to initiate the generation of security information comprising sensitive data such as cryptographic keys, to establish a secure communications channel, between the sensor and the WAP, when located within the secure perimeter.

Embodiments described herein ensure it is not possible for security information such as cryptographic key material to be introduced into a system from outside of a respective secure perimeter. One legitimate route of entry is via a computing device, when it is within the secure perimeter and which sends an initiation signal to the sensor to cause the sensor to generate security information. For the purposes of the present description, the computing device is assumed to be trustworthy, as is the operator of the computing device, when operation thereof takes place within the secure perimeter.

Figure 1:
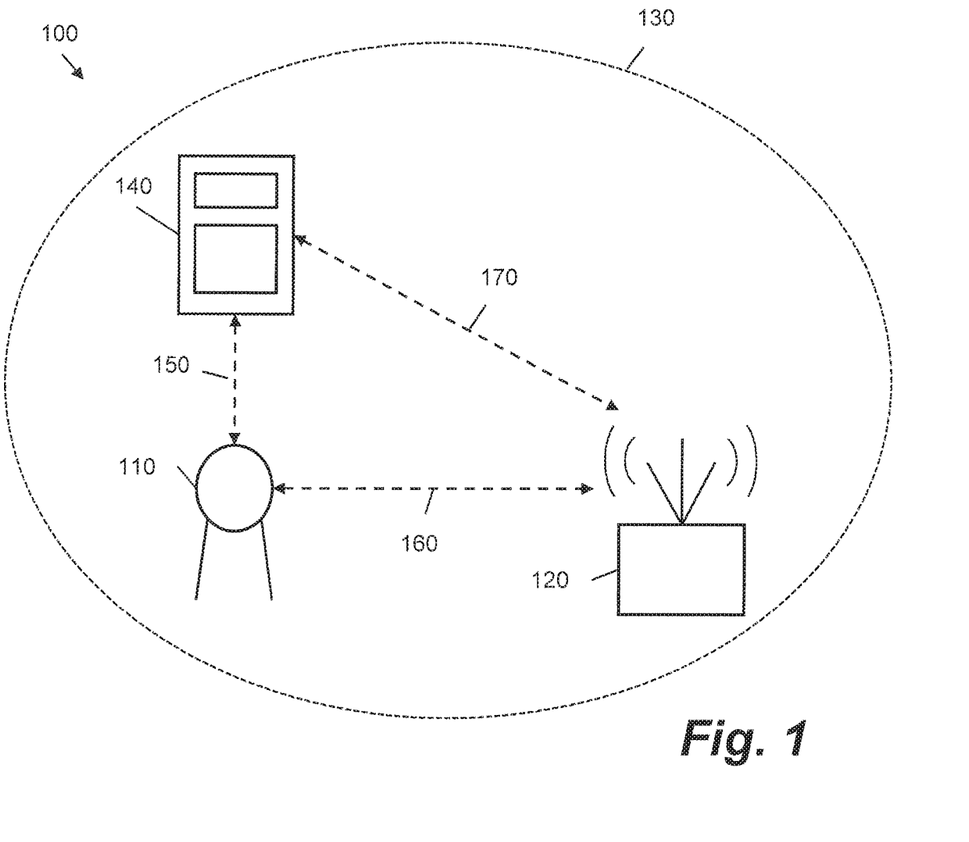
FIG. 1 is a schematic view of a computing device in communication with a system comprising a sensor and a wireless access point (WAP) according to an example.

FIG. 1 is a simplified schematic block diagram of a system 100 according to an example. The system 100 comprises a sensor arrangement 110 and a WAP 120. The sensor arrangement 110 and WAP 120 are illustrated as being within a secure perimeter, which is depicted by a boundary line 130.

According to the present example, aside from a sensor, the sensor arrangement 110 comprises a wireless interface, which is adapted to transmit and receive signals within at least two pre-configured bandwidths and/or implement at least two communications protocols. The wireless interface may comprise a single antenna or multiple antennae, depending, for example, on whether different frequency ranges are required. The sensor arrangement also comprises a communications module, a processing device to facilitate processing operations and a storage device to store information. In one case the processing device comprises at least two separate processors which independently communicate with respective parts of the wireless interface to transmit signals over each of the at least two pre-configured bandwidths and/or implement the at least two communications protocols. Various different configurations of sensor arrangement may be deployed according to the specific needs of the particular implementation. In this description the terms "sensor arrangement" and "sensor" may be used interchangeably and/or as the context dictates. According to the example, the sensor 110 is adapted to receive signals from a computing device 140 within a first pre-configured bandwidth and/or using a first protocol over a first communications channel 150, when the computing device 140 is moved into the proximity of the sensor 110 and is within the secure perimeter 130.

The WAP 120 may be any device or circuit capable of transmitting signals over one or more communications channels. In one embodiment the WAP 120 is a device comprising a memory, a processor and a wireless interface comprising a transmitter and receiver. According to a second embodiment the WAP 120 is an integrated circuit (IC) coupled to an external processor and memory. The WAP 120 may be an arrangement comprise plural components. For example, the WAP 120 may comprise a Radio Frequency (RF) module, for example including a suitable antenna or plural antennas, coupled to an external power source and microcontroller. In some embodiments, the WAP may be arranged to be communicatively coupled with other components or systems, for example via wireless or wired (or optical) connections. The WAP may thereby be arranged to receive information from the other components or systems and/or send information to the other components or systems. Such information may include that exchanged with a sensor and/or a computing device.

The computing device 140 is arranged to transmit signals via a wireless interface over the first communications channel 150, wherein the first communications channel 150 is operable inside the secure perimeter. The computing device 140 is typically controllable by an operator. The computing device 140 may communicate information such as position information of the sensor 110 relative to the WAP 120, a serial number or other identifying information related to the sensor 110 and/or commands for instructing the processing module of the sensor 110 to execute one or more operations. For example, the computing device may send a signal to the sensor instructing the processing module to generate and store data or generate messages for transmission to other devices. The sensor 110 may comprise a processing module arranged to process signals received via the wireless interface.

In one example, the first communications channel 150 is a relatively short range wireless communications channel operable inside the secure perimeter 130. For example, the first communications channel could be an infrared communications channel, a near field communications channel (NFC), or RFID. In a second example, the first communications channel is a wired channel. For example, a USB connection between the sensor 110 and computing device 140 may be used as a wired communications channel. The range of the first communications channel may dictate the distance and/or extent of the secure boundary 130 from the sensor 110.

In FIG. 1, the WAP 120 is arranged to receive signals from the sensor over a second communications channel 160 within the secure perimeter, for example, via a wireless interface of the WAP. The second communications channel 160 is a wireless communications channel over which the sensor 110 and WAP 120 are configured to communicate inside the secure perimeter. The second communications channel 160 may be, for example, a Wi-Fi channel, Zigbee channel, Ultra-Wideband channel (UWB) or a channel in a Personal Area Network (PAN). The WAP 120 comprises a processing module which is arranged to process signals received from the sensor over the second communications channel 160.

The WAP 120 is arranged to transmit signals wirelessly to the computing device 140 over a third communications channel 170 inside the secure perimeter. As described herein messages sent between the computing device 140, sensor 110 and WAP 120 can be used to establish a secure communications channel between the sensor and WAP which, in combination with the secure perimeter, protect the arrangement from man-in-the-middle attacks of the kind previously described.

Figure 2:
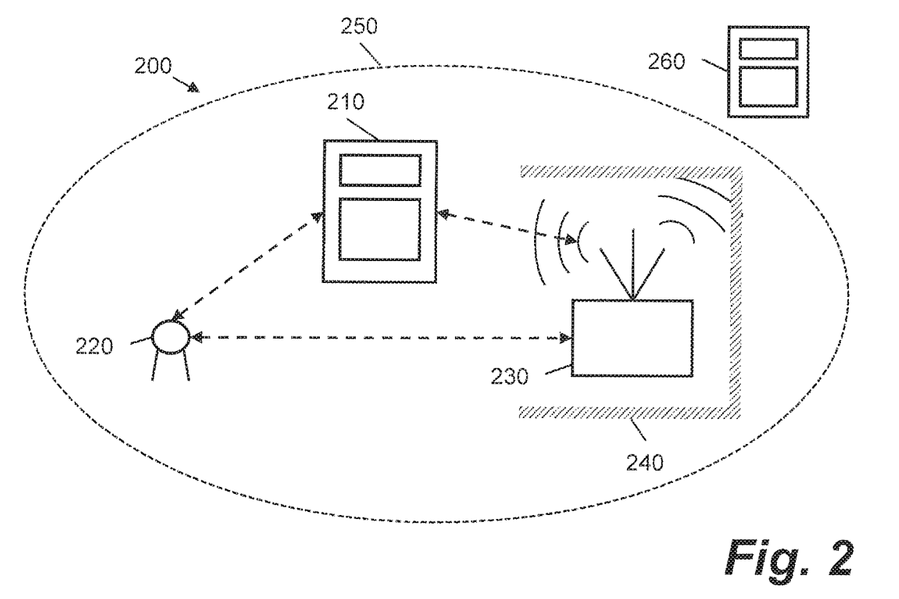
FIG. 2 is a schematic view of a system comprising a sensor and a WAP with physical shielding, in communication with a computing device, according to an example.

FIG. 2 is a simplified schematic block diagram of an exemplary system 200 and a computing device 210. The system comprises a sensor 220 and a WAP 230, similar to those shown in FIG. 1 physically inaccessible to the computing device 210 but in communication with the computing device 210. The WAP 230 shown in FIG. 2 is surrounded, in part, by physical shielding 240. The computing device 210 is arranged to communicate over a first communications channel with the sensor 220. The physical shielding 240 acts to prevent the wireless signal transmitted over the third communications channel from being detected outside the secure perimeter 250. In this way, the physical shielding 240 can influence the shape of the secure perimeter 250. The physical shielding 240, for example, can assist in preventing an unauthorised device, for example a computer system 260, which is located outside of the secure perimeter from being used to intercept a message transmitted by the WAP 230. In particular, a device that is able to intercept from the WAP 230 messages that are intended for the computing device 210 could potentially modify messages and relay messages of its own to the computing device 210 and, via the computing device to the sensor 220 from outside the secure perimeter 250.

Figure 3:
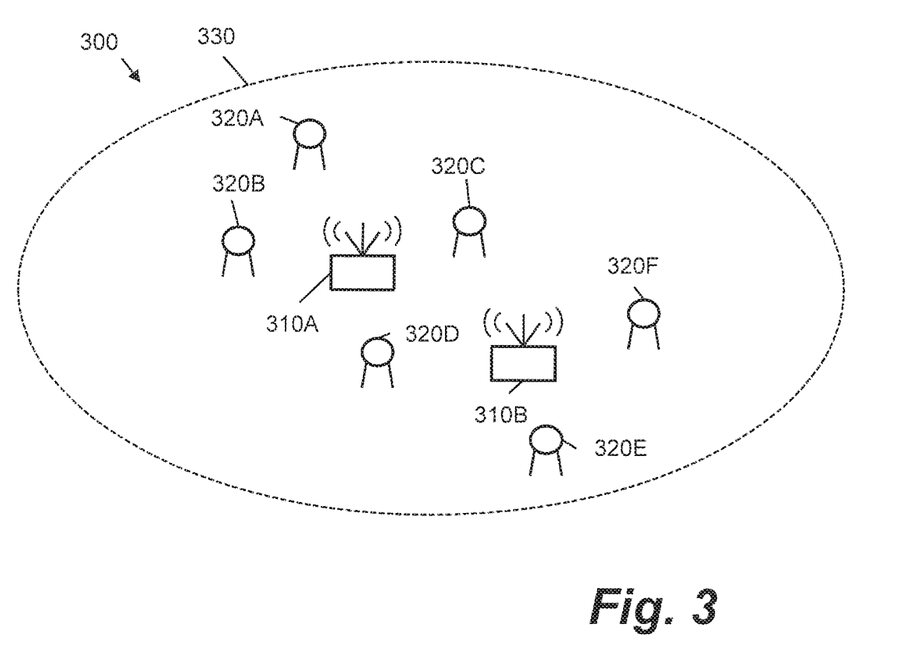
FIG. 3 is a schematic view of a system comprising a plurality of sensors in communication with WAPs, according to an example.

FIG. 3 is a simplified schematic block diagram of a system 300 according to an example. The system 300 comprises a first WAP 310A and a second WAP 310B, each of which is similar to the WAP 120 that is shown in FIG. 1, and a number of sensors, 320A-320F, each of which is similar to the sensor 110 that is shown in FIG. 1. The sensors 320A-320F are distributed within a secure perimeter 330 in locations that are proximal to the WAP 310A and the WAP 310B.

In FIG. 3, each one of the sensors, 320A-320F, is arranged to communicate with at least one WAP, 310A and 310B, in a manner similar to the system 100 of FIG. 1. According to an example the sensors 320A-320F can use security information exchanged with the WAPs 310A, 310B to establish a secure communications channel with at least one WAP, 310A or 310B.

Figure 4:
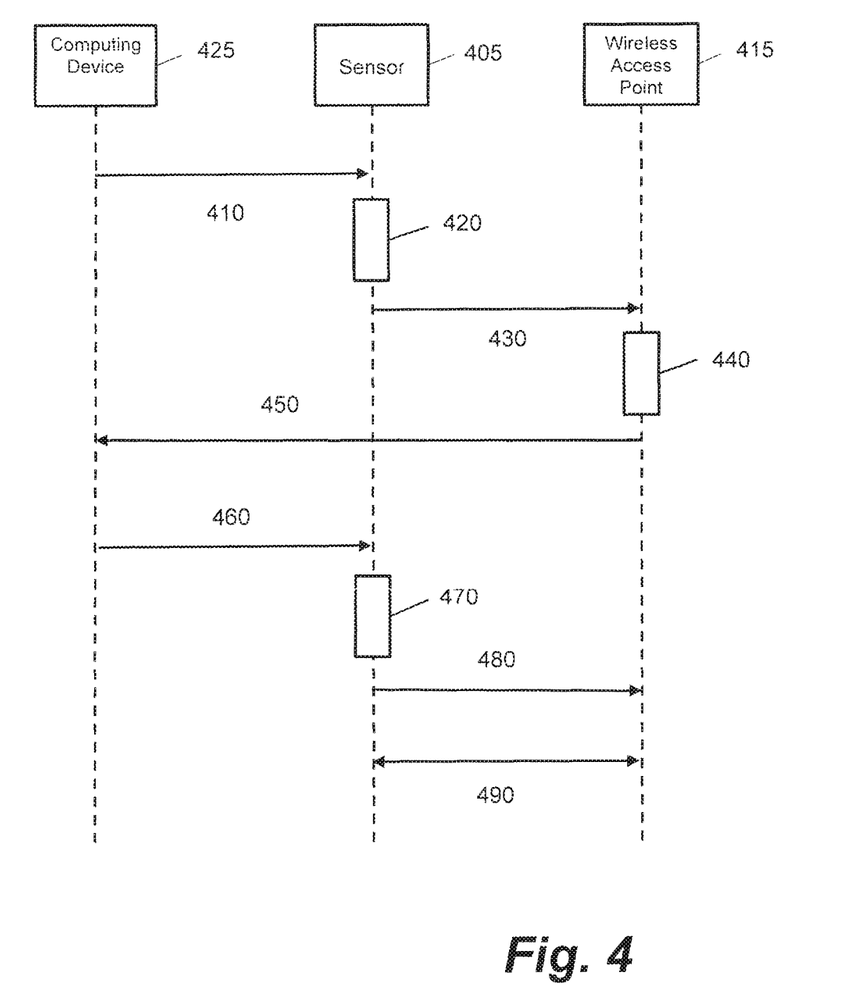
FIG. 4 is a message flow diagram illustrating an exchange of messages between a sensor, a WAP and a computing device, according to an example.

FIG. 4 is a message flow diagram, which illustrates, by way of example, an exchange of messages, in an arrangement of the kind that is illustrated in FIGS. 1 to 3, in which a sensor 405 establishes a secure communications channel with a WAP 415. The message flow is initiated by a computing device 425.

At step 410, the sensor 405 receives an initiation signal from the computing device 425 over a first communications channel between the computing device 425 and the sensor 405. At step 420, the sensor 405 is responsive to the initiation signal to generate and store first security information, which will be used to establish a secure communication session with the WAP 415.

At step 430, the sensor 405 transmits a first message comprising information representing at least a part of the first security information to the WAP 415 over a second communications channel, wirelessly. The WAP 415 is arranged to receive the first message transmitted by the sensor 405. In response to receipt of the message, at step 440, the WAP is arranged store the first message and to generate and store second security information. As described in relation to FIG. 1, the WAP 415 can transmit messages via a third communications channel to transmit to the computing device 425. A step 450, the WAP 415 is arranged to transmit a second message comprising information representing at least a part of the second security information to the computing device 425.

At step 460, the computing device 425 relays the second message over the first communications channel to the sensor 405. At step 470, the sensor 405 stores the second message.

The sensor 405 and WAP 415 now each hold at least part of the security information that has been generated by the other. The sensor 405 and WAP 415 can use the respective parts of the received security information in combination with the security information that they generated to perform secure communications with one another.

In FIG. 4, the sensor 405 is arranged to send an acknowledgement message to the WAP 415 at step 480 prior to establishing a secure connection for performing secure communications 490. The acknowledgement message informs the WAP 415 that the sensor 405 has received the second message, relayed by the computing device 425, and is now available to perform secure communications based on the shared security information.

According to an example, the shared security information comprises a shared cryptographic key generated from knowledge of the first and second security information. In particular, after exchanging messages comprising at least parts of the first and second security information, the sensor 405 and WAP 415 can generate a cryptographic key. One example of such a cryptographic key is that generated by the Diffie-Hellman protocol. In the case of the Diffie-Hellman protocol, the cryptographic key is derived from the first and second security information which each comprise arbitrary Diffie-Hellman parameters. In an example, the acknowledgement message sent at step 480 comprises a Message Authentication Code (MAC) derived from the cryptographic key generated by the sensor 405. The WAP 415 is arranged to generate a MAC from its own cryptographic key, and compare the generated MAC to the received MAC. If the generated MAC and the received MAC equal the same value, the WAP 415 has confidence that the key in the MAC is that which it generated and that the sensor 405 and WAP 415 are sharing the same cryptographic key. Subsequently the sensor 405 and WAP 415 can use the shared cryptographic key to authenticate but also encrypt messages between them in a secure communication session.

Referring back to FIG. 3, two or more of the sensors 320A-320F can use an exchange of messages over the various communications channels, similar to those described in FIG. 4 for a single sensor and WAP, to establish a secure communications channel between one another. For example, if sensor 320A has established a first secure communications channel with WAP 310A and sensor 320B has established a second secure communication session with WAP 310A, they may communicate via the WAP to establish a third secure communication session with each other.

In an example, two or more sensors can use a cryptographic protocol such as RSA encryption or Diffie-Hellman key exchange to establish a secure symmetric encryption key. In one case, following establishment of a secure communications channel via a WAP, sensors 320A-320F may be able to communicate directly with one another through their respective wireless interfaces, if they are in range of one another. In particular, it is possible to have a networked array of sensors distributed within the secure perimeter 330 once the sensors have received an initiation from a computing device as described at step 410.

Figure 5:
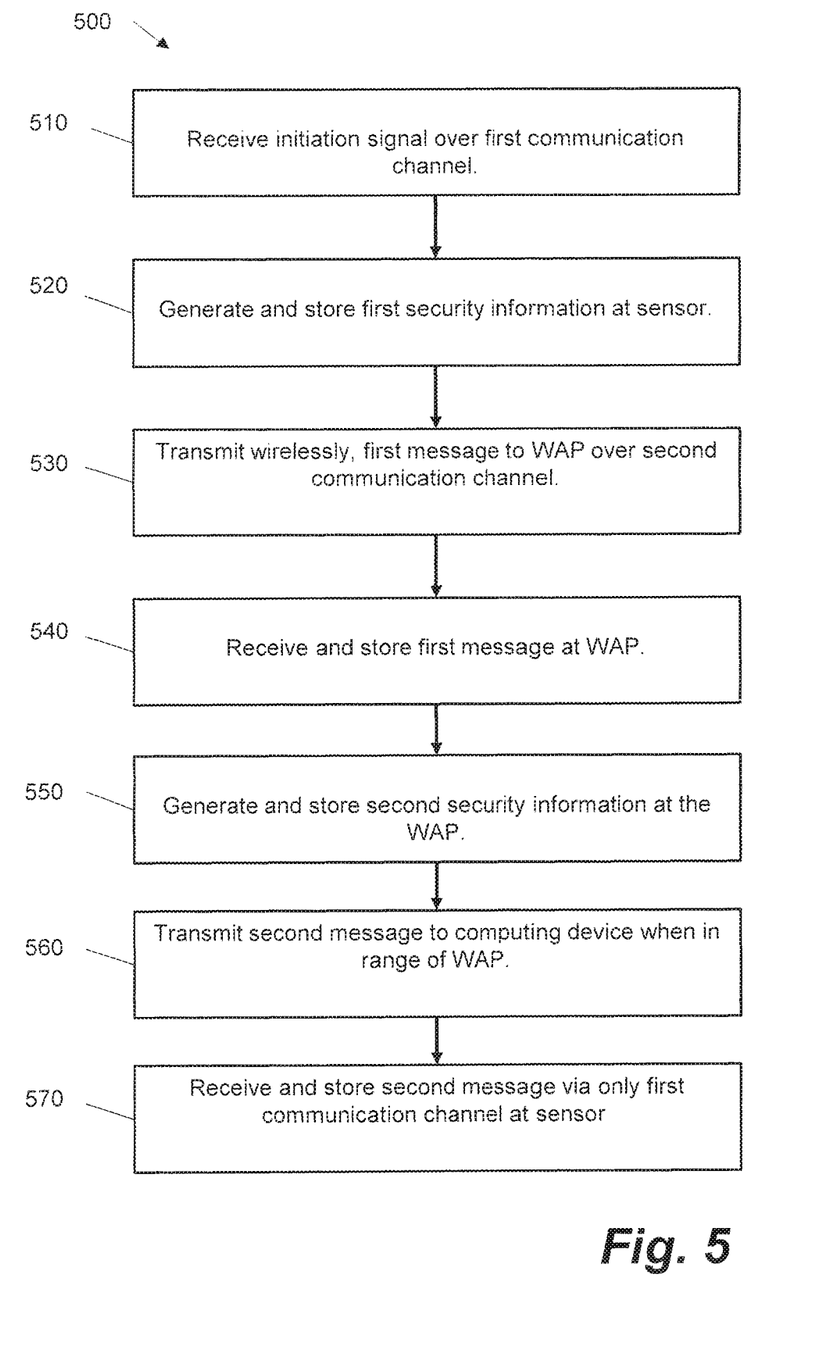
FIG. 5 is a flow diagram illustrating a method of exchanging security information according to an example.

FIG. 5 is a flow diagram illustrating a method 500 of exchanging security information between a sensor and WAP, according to an example. The method 500 may be implemented on the systems that are shown in FIGS. 1 to 3, which show various embodiments of systems comprising one or more sensors and WAPs.

At block 510, an initiation signal is received over a first communications channel from a relatively proximal computing device. According to an example the initiation signal is generated at a computing device such as computing device 140 shown in FIG. 1. At block 520, first security information is generated and stored at the sensor in response to the initiation signal received at block 510.

At block 530, a first message is transmitted wirelessly to the WAP over a second communications channel. The first message comprises information representing at least a part of the first security information. The first message may be transmitted via any suitable wireless communications channel such as over a Wi-Fi network or a wireless PAN such as ZigBee. According to an example, the first message comprises additional information such as location information or a serial number of the sensor or other pertinent parameters which were generated and/or sent to the sensor when the sensor received the initiation signal from the computing device.

At block 540, the first message is received and stored at the WAP. The WAP stores the first message.

At block 550 the WAP is arranged to generate and store second security information at the WAP. As described in relation to systems 100 to 300 in FIGS. 1 to 3 the first and second security information may comprise data relating to cryptographic keys and may be generated by executing one or more cryptographic operations on the sensor and WAP. The data relating to cryptographic keys can be used to establish, for example, shared cryptographic keys between the sensor and WAP to allow secure communications to be performed.

At block 560, the WAP is arranged to transmit a second message to the computing device via a third communications channel when in range of the WAP. The second message comprises information representing at least a part of the second security information. According to an example, transmission of the second message is via a transmission by the WAP and the computing device is arranged to receive the message when in the secure perimeter. In another example, the WAP has a separate communications channel with the computing device. For example, the method 500 may be used with a computing device and a system comprising a WAP and sensor, where the WAP has pre-configured secure communications channel with the computing device. The computing device is arranged to receive the second message transmitted by the WAP and to relay the message on to the sensor.

At block 570 the second message is received via only the first communications channel and is stored by the sensor. Arranging that the second message may be received only via the first communications channel ensures, in the case that the first communications channel is trusted and the computing device is trusted, that data contained in the message received at the sensor has not been accessed or modified by unauthorized users. Moreover, if, as described in relation to previous examples, the method is executed on a system in a secure perimeter and security arrangements are in place to ensure that the second message transmitted from the WAP cannot be intercepted by a malicious device (for example, through the use of physical shielding as described with reference to FIG. 2) then the second message received at the sensor has not been accessed or modified by unauthorized users.

Figure 6:
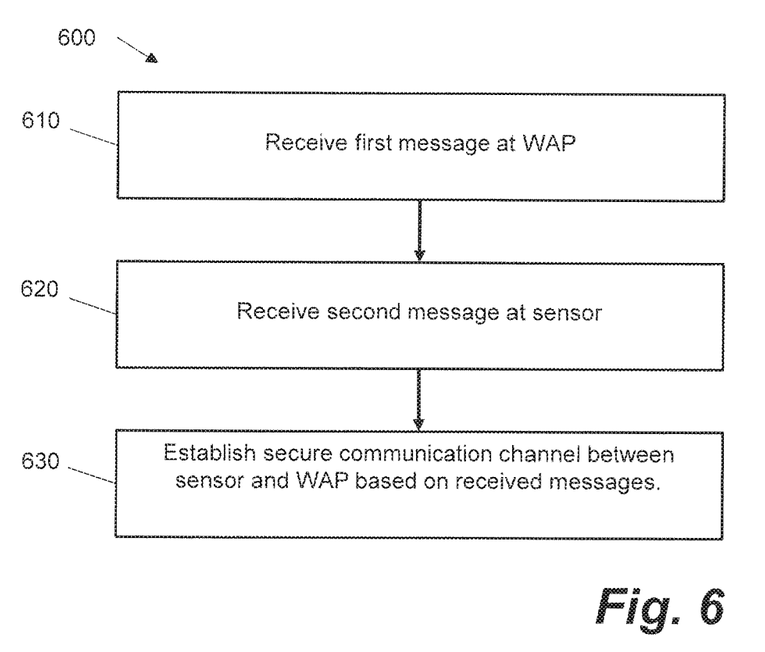
FIG. 6 is a flow diagram of a method of exchanging security information.

FIG. 6 is a flow diagram illustrating a method 600 of establishing a secure channel between a sensor and a WAP. The method 600 may generally be used in conjunction with the other methods and systems described herein to establish secure communications channels. In particular the method 600 may be implemented on the sensor and WAP shown in FIG. 1 to establish a secure connection.

At block 610 a first message is received at a WAP. For example, a first message is sent from a sensor (such as the sensor 110), comprising first security information which may be used to establish a secure communication session with the WAP. Alternatively, the message may originate from the sensor or may be received via a trusted third party (not shown in FIGS. 1 to 3), which communicates with the sensor and WAP.

At block 620 a second message is received at the sensor. For example, in one case, a computing device such as the computing device 140 described in FIG. 1 acts as a point of trust of communications with the sensor and passes a second message generated at the WAP to the sensor. The second message comprises, according to an example, information such as security information which is used by the sensor to establish a secure communications channel with the WAP. According to an example, the second message comprises information which can be used to derive security information to establish a secure communications channel with the WAP. For example, in the case where the exchanged messages comprise cryptographic keys, such as Diffie-Hellman keys, the actual security information may be derived from the information received in the first and second messages or used to generate further additional information which is used to establish the secure communication session, for example additional identifying information of the WAP and sensor. The steps at block 610 and 620 may be performed in response to receipt of an initiation signal at the sensor.

At block 630 a secure communications channel between the sensor and WAP is established, based on the received messages. For example, in the case that the messages comprise security information, the communications channel is established based on the security information. This could be as a result of, for example, a successful exchange of cryptographic public keys, allowing a symmetric key to be agreed between the parties.

Figure 7:
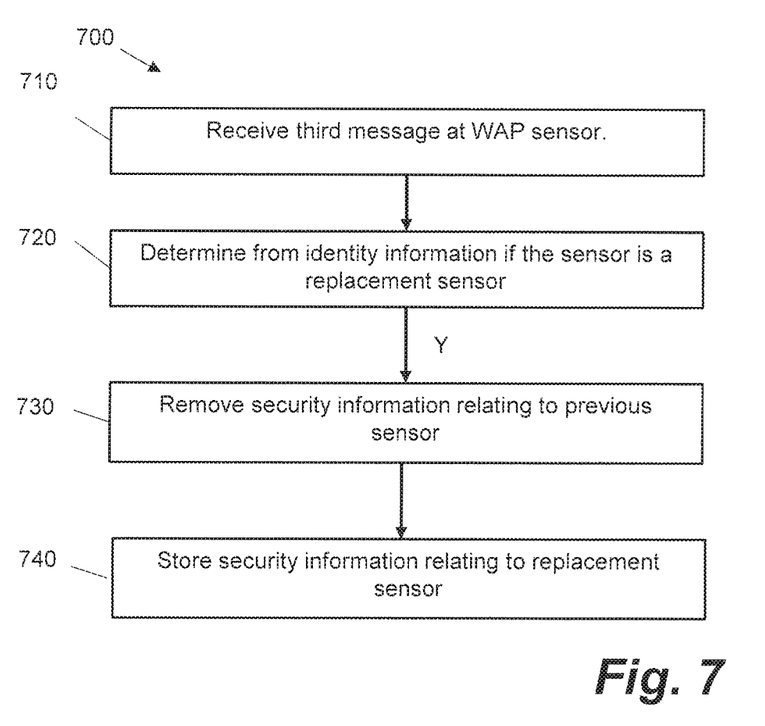
FIG. 7 is a flow diagram illustrating a method of removing redundant security information according to an example.

FIG. 7 is a flow diagram showing method 700, according to an example, of removing redundant security information accessible to a WAP. The method may be used in conjunction with the method 500 shown in FIG. 5, where a previous sensor has exchanged security information with a WAP, and where a new sensor replacing the first sensor, exchanges security information with the WAP. The WAP is arranged to determine, from identity information, if the new sensor is a replacement sensor. For example, in the case where the sensors and WAP establish secure communications channels using cryptographic techniques as described herein, the method 700 may be used to prevent legacy cryptographic keys being used to communicate with the WAP. According to an example the identity information in the new sensor identifies that the new sensor is a replacement sensor for the first sensor. For example, the identity information could be information identifying the sensor as a replacement based on role, or location or serial number identifying sensors and locations.

At block 710, a third message is received at the WAP from the sensor which has exchanged security information with the WAP according to the method 500 shown in FIG. 5. At block 720, the WAP is arranged to determine, from identity information if the sensor is a replacement sensor for a previous sensor. For example, in one case the sensor is identified by a serial number which can be checked against a database comprising known locations of sensors relative to the position of the WAP and serial numbers of sensors from which it can be determined if the sensor is a replacement sensor.

At block 730, if it is determined that the sensor is a replacement sensor, the WAP is arranged to remove any previous security information stored for a previous sensor with matching identity information. According to an example, this ensures that the WAP only stores security information relating to the sensors currently in use. For example, in the case where a system comprising a sensor and WAP, such as system 100 shown in FIG. 1 is implementing the method 700, and the system 100 is surrounded by a secure perimeter, the method 700 can be used to ensure it is only possible to establish a secure communications channel between sensors and the WAP which are identified in locations contained in the secure perimeter. At block 740, security information relating to the replacement sensor is stored at the WAP.

Figure 8:
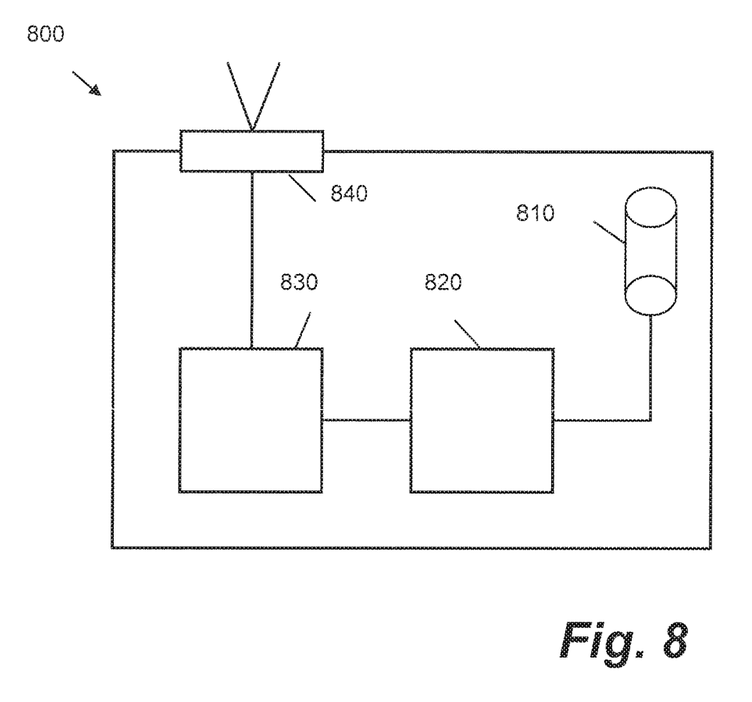
FIG. 8 is a schematic view of a sensor arrangement, according to an example.

FIG. 8 shows a sensor arrangement 800 according to an example. The sensor arrangement 800 may be used with the systems and methods described herein. The sensor arrangement 800 comprises a sensor 810 in communication with a processing device 820. The processing device 820 is arranged to facilitate processing operations with information received from a communications module 830 and also to communicate information received from the sensor 810 to the communications module. The communications module 830 is arranged to receive and transmit signals via a wireless interface 840. The wireless interface 840 may comprise antenna arranged to transmit and receive signals over two or more pre-configured bandwidths. In an alternative arrangement one or more bandwidths may be used to transmit and receive signals at the wireless interface 840. The processing device 820 (which may comprise one or more processors, as indicated above) can execute two or more communications protocols for sending and receiving signals via the communications module 830 and the wireless interface 840.

Methods and systems described herein provide a means of securing an exchange of security information between a sensor and a WAP. Examples of the system provide an improved means of establishing a secure communications channel between the sensor and WAP via the use of a trusted computing device in proximity to the sensor and WAP, which provides a means for exchanging the security information necessary to establish a secure communications channel in a way which prevents so called "man in the middle" attacks. In particular, the system described herein performs an assisted authenticated exchange of security information. The system does not require any security information to be pre-loaded on to the sensor before coming in to contact with the trusted computing device, however, advantageously the system provides guarantees to the WAP of the authenticity of the security information received from the sensor. Similarly, the sensor can be ensured of the authenticity of the security information received from the WAP. In the case where a secure communications channel is established using an exchange of cryptographic keys, the system guarantees the authenticity of the cryptographic keys as originating from the sensor and the WAP, without requiring an external party to vouch for the authenticity of the exchanged keys. Subsequent removal of a sensor and potential access of the sensor's security data will not have any effect on the system due to the fact that, once a new sensor is securely connected to the WAP, any previously-stored security data associated with the removed sensor is erased.

According to an example an arrangement of the WAP and one or more sensors may be used on an aircraft. In such an arrangement the WAP may be located near to or in the undercarriage of the aircraft and within range of the one or more sensors which can, for example, be used to monitor the tyre pressure on each of the wheels of the aircraft. Other arrangements and other kinds of sensors, in aircraft or in other scenarios may of course benefit from embodiments of the invention.

Although the invention has been described above with reference to one or more 10 preferred embodiments, it will be appreciated that various changes or modifications may be made without departing from the scope of the invention as defined in the appended claims.

The invention claimed is:

1. A system comprising:
a sensor, which is responsive to receipt of an initiation signal, via a first communications channel, from a relatively proximal computing device, to generate and store first security information and to transmit, wirelessly via a second communications channel, a first message comprising information representing at least a part of the first security information; and
a Wireless Access Point (WAP), which is remote from the sensor and which is arranged to receive and store the first message, to generate second security information and to transmit wirelessly to the computing device, via a third communications channel when the computing device is within range of the WAP, a second message comprising information representing at least a part of the second security information,
wherein the sensor is arranged to receive at least the second message from the computing device via only the first communications channel,
wherein the third communications channel is a pre-configured secure communications channel between the WAP and the computing device, and
wherein the WAP and the sensor are arranged to establish, based on the first and second security information, a secure communications channel and to communicate securely thereon with one another.

2. The system according to claim 1 wherein the first communications channel is a wireless communications channel.

3. The system according to claim 1 wherein the first communications channel is a short-range communications channel.

4. The system according to claim 1, wherein the second communications channel is a medium range communications channel relative to the first communications channel.

5. The system according to claim 1, wherein the WAP is arranged to communicate wirelessly with the computing device and sensor on a medium range wireless interface.

6. The system according to claim 1, wherein the sensor and WAP are arranged to operate within a secure perimeter which includes one or more zones into which unauthorized persons cannot physically enter.

7. The system according to claim 1, wherein at least part of the WAP is physically shielded to restrict directions from which the WAP can send and/or receive wireless signals.

8. The system according to claim 1, wherein the first security information and the second security information each comprise a public and private parameter and wherein the sensor and WAP are arranged to store their respective private parameters and transmit their respective public parameters in the first and second messages.

9. The system according to claim 8 wherein the public and private parameters relate to a Diffie-Hellman parameter pair and wherein the sensor and WAP each compute a cryptographic key by the Diffie-Hellman protocol from the received messages.

10. The system according to claim 9, wherein the sensor is arranged to send the WAP a message authentication code computed from the cryptographic key generated by the Diffie-Hellman protocol.

11. The system according to claim 1, wherein the sensor is communicatively coupled to a processor and a storage device and wherein, in response to the initiation signal, the sensor is arranged to:

instruct the processor to generate first security information and store at least part of the first security information at the storage device.

12. The system according to claim 1, comprising a plurality of sensors and at least one WAP.

13. The system according to claim 12, wherein a first sensor of the plurality of sensors is arranged to establish a secure communications channel with a second sensor of the plurality of sensors, in secure communication with the WAP and communicate securely thereon with the second sensor.

14. The system according to claim 1, wherein the sensor is arranged to transmit via the second communications channel a third message to the WAP, wherein the third message comprises an acknowledgement that the second message was received at the sensor.

15. The system according to claim 1, wherein the first message comprises location information of the sensor relative to the WAP.

16. A system comprising:
a sensor, which is responsive to receipt of an initiation signal, via a first communications channel, from a relatively proximal computing device, to generate and store first security information and to transmit, wirelessly via a second communications channel, a first message comprising information representing at least a part of the first security information; and
a Wireless Access Point (WAP), which is remote from the sensor and which is arranged to receive and store the first message, to generate second security information and to transmit wirelessly to the computing device, via a third communications channel when the computing device is within range of the WAP, a second message comprising information representing at least a part of the second security information;
wherein the sensor is arranged to receive at least the second message via only the first communications channel;
wherein the first message comprises location information of the sensor relative to the WAP; and
wherein, in response to receipt of a third message from the sensor at the WAP, the WAP is arranged to determine from location information received in the first message, if the sensor is a replacement sensor for a previous sensor identified at the same location relative to the WAP, and in response to determining the sensor is a replacement sensor, remove security information relating to the previous sensor.

17. The system according to claim 12, wherein the plurality of sensors are identified by a position relative to the at least one WAP.

18. A method of exchanging security information between a sensor and a Wireless Access Point (WAP) comprising:
receiving an initiation signal over a first communications channel at the sensor from a computing device while the sensor is proximate the computing device;
generating and storing first security information at the sensor in response to receipt of the initiation signal;
transmitting wirelessly by the sensor via a second communications channel to the WAP, a first message comprising information representing at least part of the first security information;
receiving and storing the first message at the WAP;
generating and storing second security information at the WAP;
transmitting wirelessly by the WAP, via a third communications channel, to the computing device when the computing device is within range of the WAP, a second message comprising information representing at least part of the second security information, wherein the third communications channel is a pre-configured secure communications channel between the WAP and the computing device;
the computing device transmitting the second message to the sensor via the first communications channel;
receiving and storing the second message via only the first communications channel at the sensor, and
wherein the WAP and the sensor are arranged to establish, based on the first and second security information, a secure communications channel and to communicate securely thereon with one another.

19. A system configured to provide secure communication comprising:
a secured perimeter which includes one or more zones into which unauthorized persons cannot physically enter;
a sensor within the secured perimeter and configured to:
(i) receive an initiation signal via a first communications channel from a computing device within the secured perimeter,
(ii) generate and store first security information;
(iii) transmit, wirelessly via a second communications channel, a first message including information representing at least a part of the first security information, and
(iv) securely communicate with the WAP based on the first security information and a second security information; and
a Wireless Access Point (WAP) within the secured perimeter and separated from the sensor, the WAP is configured to:
(i) receive and store the first message,
(ii) generate second security information, and
(iii) transmit wirelessly to the computing device, via a third communications channel and while the computing device is within range of the WAP, the second message, wherein the second message is generated by the WAP and includes information representing at least a part of the second security information,
wherein the sensor is arranged to receive at least the second message from the computing device solely via the first communications channel; and
wherein the third communications channel is a pre-configured secure communications channel between the WAP and the computing device.

20. The system of claim 19 wherein the secure perimeter is within and/or proximate to an aircraft, and the sensor and WAP are on or within the aircraft.

21. The method of claim 19 further comprising the sensor sending a third message to the WAP via the second communications channel with information indicating that the sensor received the second message.

22. The method of claim 21 further comprising the sensor and WAP securely communicating via the second channel after the sensor receives the second message.

* * * * *